(12) United States Patent
Ben-Dvora et al.

(10) Patent No.: US 10,218,596 B2
(45) Date of Patent: Feb. 26, 2019

(54) PASSIVE MONITORING AND MEASUREMENT OF NETWORK ROUND TRIP TIME DELAY

(71) Applicant: CISCO TECHNOLOGY, INC., San Jose, CA (US)

(72) Inventors: Nir Ben-Dvora, Herzliya (IL); Lior Katzri, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 15/430,255

(22) Filed: Feb. 10, 2017

(65) Prior Publication Data

US 2018/0234316 A1 Aug. 16, 2018

(51) Int. Cl.
*H04L 12/26* (2006.01)

(52) U.S. Cl.
CPC ........ *H04L 43/0864* (2013.01); *H04L 43/087* (2013.01); *H04L 43/062* (2013.01)

(58) Field of Classification Search
CPC ............. H04L 43/0864; H04L 43/0841; H04L 43/06–43/067; H04L 43/0823–43/0847; H04L 43/0852–43/087; H04L 43/10–43/106
See application file for complete search history.

(56) References Cited

U.S. PATENT DOCUMENTS

| | | |
|---|---|---|
| 2007/0133432 A1 | 6/2007 | De Noia et al. |
| 2015/0359016 A1 | 12/2015 | Barany et al. |
| 2016/0014711 A1 | 1/2016 | Aldana et al. |
| 2016/0072689 A1 | 3/2016 | Aldana et al. |
| 2016/0198429 A1 | 7/2016 | Prechner et al. |
| 2016/0359712 A1 | 12/2016 | Alizadeh Attar et al. |
| 2016/0380860 A1 | 12/2016 | Singhal |
| 2017/0019321 A1 | 1/2017 | Aldana et al. |
| 2017/0295099 A1* | 10/2017 | Murphy ................. H04L 47/125 |

* cited by examiner

*Primary Examiner* — Eric Myers

(57) ABSTRACT

A method is described and in one embodiment includes receiving at a first network element of a communications network a first packet corresponding to a first traffic flow from a first end user device to a second end user device at a time T1; receiving at the first network element a second packet corresponding to a second traffic flow from the second end user device to the first end user device at a time T2; calculating by the first network element a difference α1 between the time T1 and the time T2; creating at the first network element a first record including the calculated difference Δ1; and providing the first record to a network collector device, wherein the network collector device compares the first record with a second record received from a second network element to determine a Round Trip Time ("RTT") delay for the communications network.

20 Claims, 6 Drawing Sheets

# PASSIVE MONITORING AND MEASUREMENT OF NETWORK ROUND TRIP TIME DELAY

TECHNICAL FIELD

This disclosure relates generally to communications networks and, more particularly, to techniques for passive monitoring and measurement of round trip time ("RTT") delay in such networks.

BACKGROUND

Passive monitoring is a mechanism implemented in a network to measure an application's performance metrics using the actual data traffic and export those measurements and metrics to a collector/management system where they may be analyzed and used to improve network performance. Media traffic and RTP specifically are key targets for use in monitoring and measuring end user experience. Existing RTP passive monitoring techniques are capable of measuring and calculating RTP jitter and RTP packet loss. Network RTP delay is an important application performance metric that is currently measurable using non-passive techniques, which may include active probing (such as Internet Protocol Service Level Agreement ("IPSLA") and Mediatrace), packet tagging and metadata, one-way delay with clock synchronization, analysis of RTP control protocol, and collection of performance data from endpoints. Each of the aforementioned non-passive (i.e., active) techniques is relatively complex and cannot always be applied, as opposed to passive monitoring techniques, which are simple and do not require any changes to the network traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
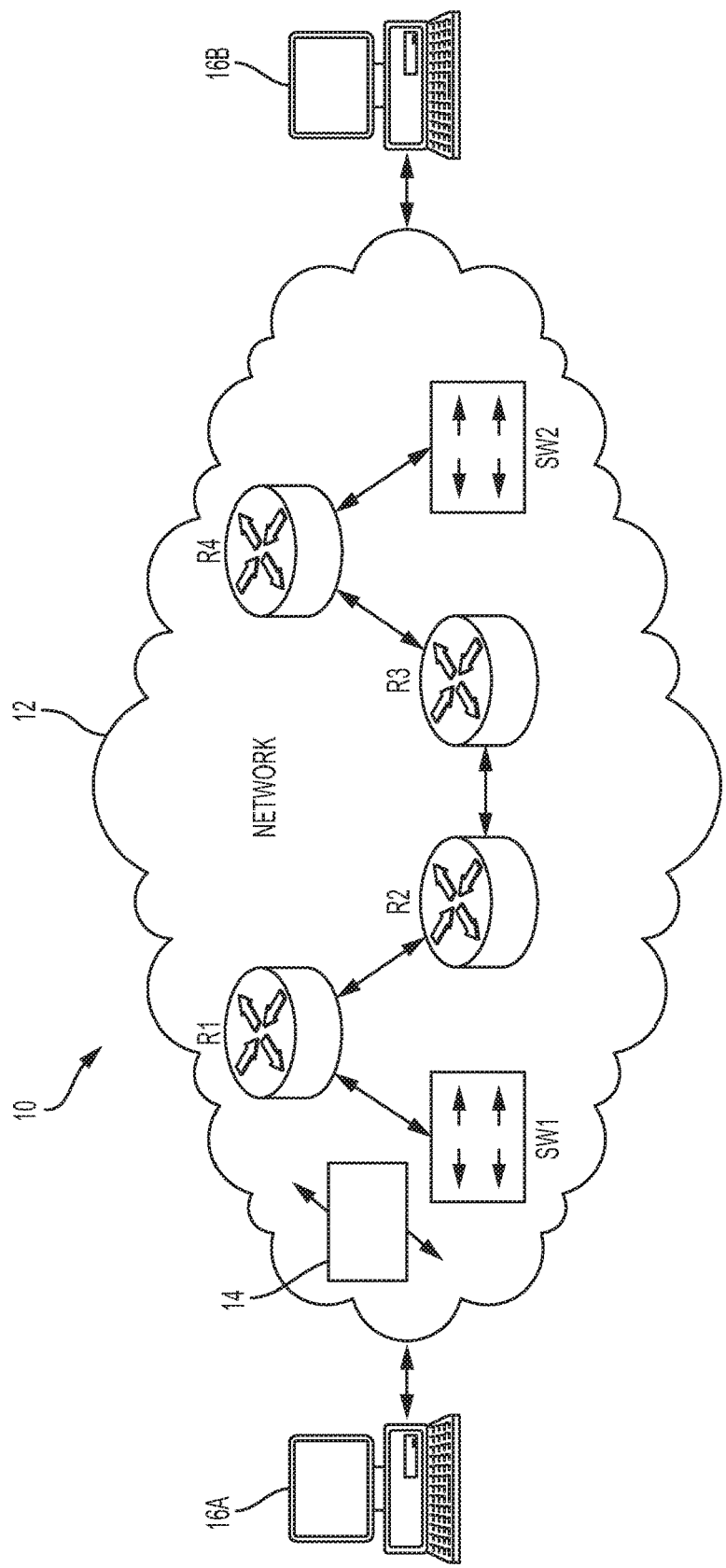
FIG. 1 is a simplified block diagram of an example communications environment in which embodiments described herein for passive monitoring and measurement of network RTP delay may be implemented.

A method is described and in one embodiment includes receiving at a first network element of a communications network a first packet corresponding to a first traffic flow from a first end user device to a second end user device at a time T1; receiving at the first network element a second packet corresponding to a second traffic flow from the second end user device to the first end user device at a time T2; calculating by the first network element a difference Δ1 between the time T1 and the time T2; creating at the first network element a first record including the calculated difference Δ1; and providing the first record to a network collector device, wherein the network collector device compares the first record with a second record received from a second network element to determine a Round Trip Time ("RTT") delay for the communications network. The method further includes receiving at the second network element of the communications network the first packet at a time T3; receiving at the second network element the second packet at a time T4; calculating by the second network element a difference Δ2 between the time T3 and the time T4; creating at the second network element the second record, wherein the second record includes the calculated difference Δ2; and providing the second record to the network collector device.

In some embodiments, the first record includes information identifying the first and second packets. In certain embodiments, the first record includes a sequence number for each of the first and second packets. In certain embodiments, the first record may include a flow tuple for each of the first and second flows. The network collector device may correlate the first and second records using at least one of a flow tuple and a sequence number included in the first and second records. The first and second network elements may include Wide Area Network ("WAN") border routers. The network collector device may be implemented using a server or may be implemented on one of the first and second network elements.

Example Embodiments

The following discussion references various embodiments or examples, for implementing different features of the present disclosure. Specific examples of components and arrangements are described below to simplify the present disclosure. These are, of course, merely examples and it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s). The present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

As will be described in greater detail below, in one embodiment, an approach is presented for calculating network RTP delay with using a purely passive monitoring scheme and without requiring extra packet generation clock synchronization or packet tagging.

FIG. 1 is a simplified block diagram of an example communications environment 10 for implementing embodiments described herein for passive monitoring and measurement of network RTP delay. The environment 10 includes a communications network 12 comprising a plurality of network nodes, devices and/or elements, including for example switches SW1 and SW2, and routers R1, R2, R3, and R4, selectively interconnected by one or more types of communications links. For example, the communications links may be wired links or shared media, such as wireless links. Certain ones of the network nodes may be in communication with other ones of the nodes, e.g., based on physical connectivity, distance, signal strength, current operational status, location, etc. As previously noted, the network nodes may include devices such as switches, routers, servers, edge devices (e.g., provider edge or "PE" devices as well as customer edge or "CE" devices), computers, etc. As will be appreciated by those skilled in the art, each of the devices may be capable of receiving packets, or frames, 14, from and transmitting packets to other devices using predefined network communication protocols, such as various wired protocols and wireless protocols, where appropriate. In the context of embodiments described herein, a protocol includes a set of rules defining how the nodes interact with one another.

As shown in FIG. 1, various end user devices, represented in FIG. 1 by two devices, including first and second end user devices 16A, 16B, respectively, may communicate with one another via the network 12. In general, end user devices 16A, 16B, may be implemented using any type of devices used to initiate a communication, such as a computer, a personal digital assistant (PDA), a laptop or electronic notebook, a cellular telephone, an IP telephone, an iPhone, an iPad, a Microsoft Surface, a Google Nexus, or any other device, component, element, or object capable of initiating voice, audio, or data exchanges within the environment 10. End user devices 16A, 16B, may also be inclusive of a suitable interface to an end user, such as a microphone, a display, or a keyboard or other terminal equipment. End user devices 16A, 16B, may also include any device that seeks to initiate a communication on behalf of another entity or element, such as a program, a database, or any other component, device, element, or object capable of initiating a voice or a data exchange via the network 12. In addition, each of the end user devices 16A, 16B, may be a unique element designed specifically for communications involving the network 12.

It will be understood that, although only a limited number of nodes and devices are shown as comprising the network 12, in actuality, any number of such nodes and devices may be deployed. Additionally, it will be recognized that, while the network 12 is illustrated as having a certain orientation, the depiction thereof is merely an illustrative example and not meant to limit the scope of the disclosure herein.

As used herein, and as generally recognized, "RTP delay" is the time takes for RTP packets to traverse a network. In many cases, RTP delay is measured by a network device using round trip time ("RTT"), which is the time it takes for packets to reach the destination and back; however, because RTP flows are uni-directional, RTT cannot be simply measured in a passive manner. On the other hand, jitter and loss are metrics that could fairly easily be measured on a uni-directional flow. In accordance with embodiments described herein for passive monitoring and measurement of network RTP delay, RTT may be measured between any two network devices using measurements collected from routers in the network, with the delay between routers calculated in a collector device.

In general, as will be described in detail below, embodiments described herein enable calculation of RTT in connection with uni-directional flows in a network as follows. First two packets are identified, one for each direction. Two edge network devices agree on the logic for identifying the same two packets. Next, the delta between receipt of the packets at each of the network devices is calculated by the respective network device. Finally, the calculated deltas are provided to a collector, which determines RTT using the deltas.

It will be recognized that embodiments described herein may have particular application in the case of RTP, which serves as the basis for examples described below.

Figure 2:
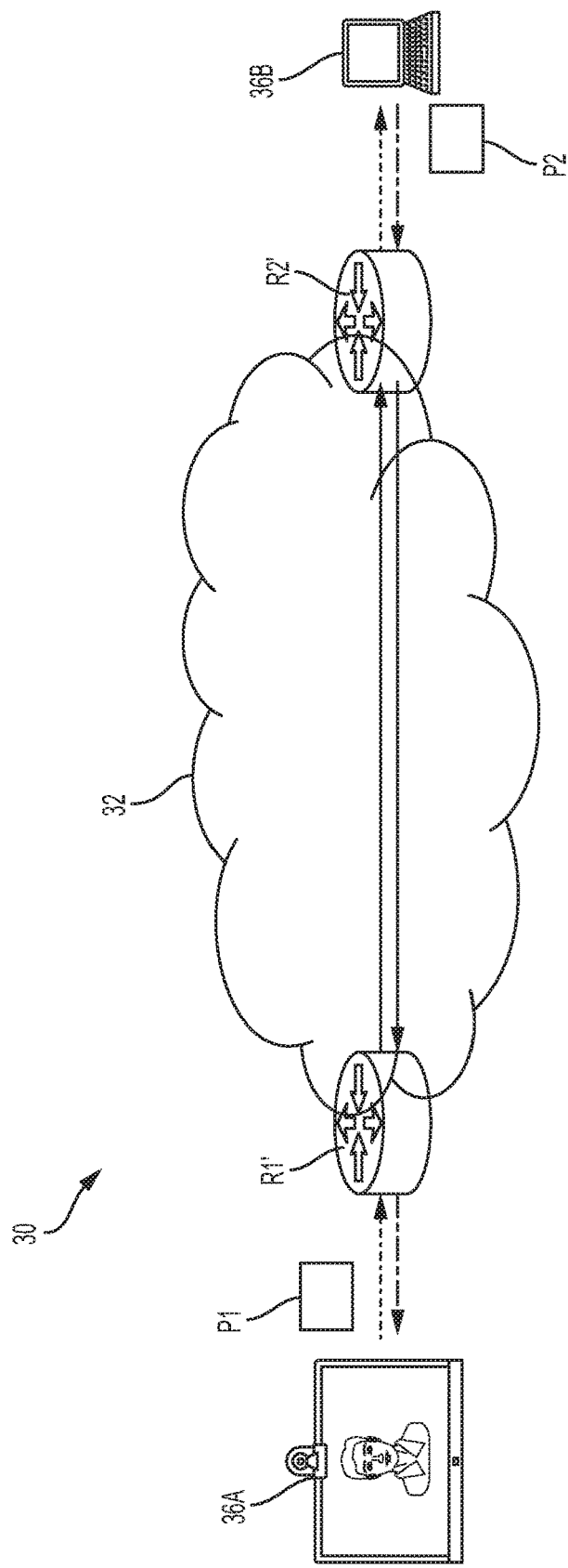
FIG. 2 is another simplified block diagram of an example communications environment in which embodiments described herein for passive monitoring and measurement of network RTP delay may be implemented.

FIG. 2 is a simplified block diagram of an example communications environment 30 for implementing embodiments described herein for passive monitoring and measurement of network RTP delay. The environment 30 includes a communications network 32 comprising a plurality of network nodes, devices and/or elements, including for example, routers R1', R2', selectively interconnected by one or more types of communications links. For example, the communications links may be wired links or shared media, such as wireless links. Certain ones of the network nodes may be in communication with other ones of the nodes, e.g., based on physical connectivity, distance, signal strength, current operational status, location, etc. As previously noted, the network nodes may include devices such as switches, routers, servers, edge devices, computers, etc. As will be appreciated by those skilled in the art, each of the devices may be capable of receiving packets, or frames from and transmitting packets to other devices using predefined network communication protocols, such as various wired protocols and wireless protocols, where appropriate. As noted above, in the context of embodiments described herein, a protocol includes a set of rules defining how the nodes interact with one another.

As shown in FIG. 2, various end user devices, represented in FIG. 2 by two devices, including first and second end user devices 36A, 36B, respectively, may communicate with one another via the network 32. In general, end user devices 36A, 36B, may be implemented using any type of devices used to initiate a communication, such as a computer, a personal digital assistant (PDA), a laptop or electronic notebook, a cellular telephone, an IP telephone, an iPhone, an iPad, a Microsoft Surface, a Google Nexus, or any other device, component, element, or object capable of initiating voice, audio, or data exchanges within the environment 30. End user devices 36A, 36B, may also be inclusive of a suitable interface to an end user, such as a microphone, a display, or a keyboard or other terminal equipment. End user devices 36A, 36B, may also include any device that seeks to initiate a communication on behalf of another entity or element, such as a program, a database, or any other component, device, element, or object capable of initiating a voice or a data exchange via the network 32. In addition, each of the end user devices 36A, 36B, may be a unique element designed specifically for communications involving the network 32. In one particular implementation, the elements R1', R2', may be Wide Area Network ("WAN") border routers that monitor traffic in the network 32.

It will be understood that, although only a limited number of nodes and devices are shown as comprising the network 32, in actuality, any number of such nodes and devices may be deployed. Additionally, it will be recognized that, while the network 32 is illustrated as having a certain orientation, the depiction thereof is merely an illustrative example and not meant to limit the scope of the disclosure herein.

Figure 3:
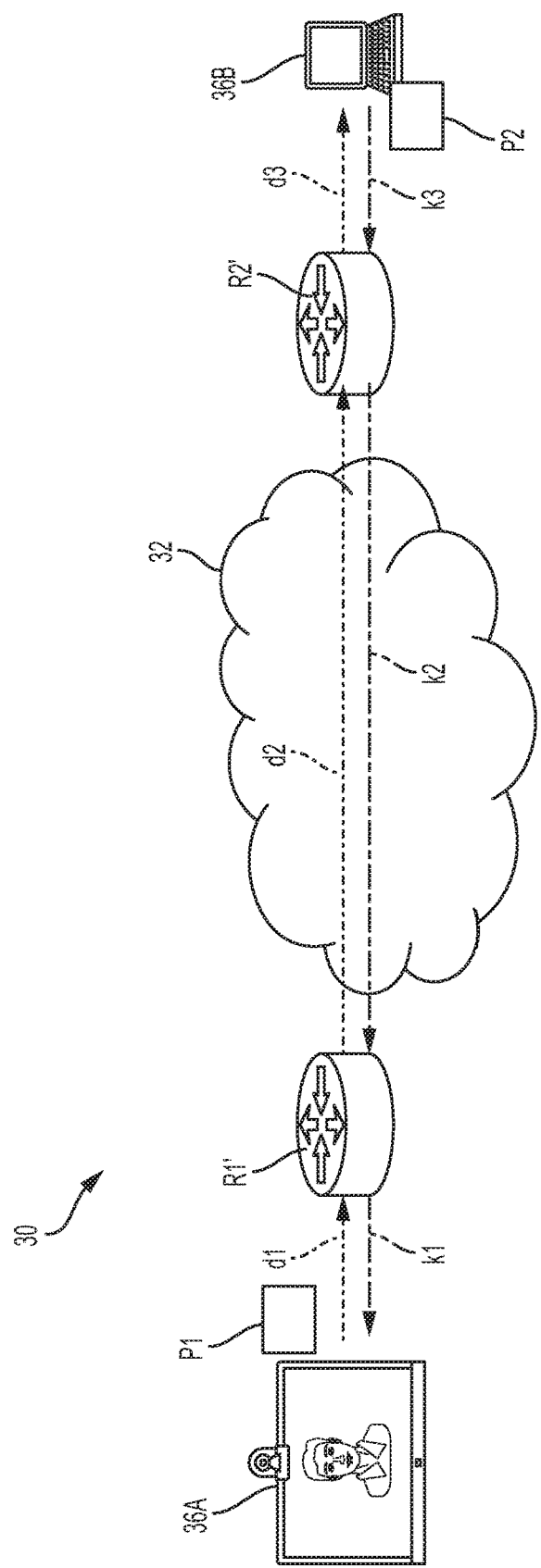
FIG. 3 is another simplified block diagram of an example communications environment in which is illustrated an example implementation of embodiments described herein for passive monitoring and measurement of network RTP delay.

Referring now to FIG. 3, a delay from end user device 36A to network element R1' is represented by an arrow designated d1, a delay from network element R1' to network element R2' is represented by an arrow designated d2, and a delay from network element R2' to end user device 36B is represented by an arrow designated d3. In the opposite direction, a delay from end user device 36B to network element R2' is represented by an arrow designated k3, a delay from network element R2' to network element R1' is represented by an arrow designated k2, and a delay from network element R1' to end user device 36A is represented by an arrow designated k1.

In operation, two packets P1 and P2 are selected for implementing embodiments described herein. One of the two packets (i.e., packet P1) is part of a media stream traversing the network 32 in a first direction from user device 36A to user device 36B, while the other (i.e., packet P2) is part of a media stream traversing the network 32 in a second direction from user device 36B to user device 36A. The manner in which the packets may be selected will be described in greater detail below. In a general case, P1 and P2 may belong to the same or to different traffic flows without affecting the operation of techniques described herein. D represents a time differential between the time at which the packet P1 is received by the end user device 36B and the time at which the second packet P2 is sent by the same end user device. The media streams in each direction are independent form the other; therefore, D could be any number. It will be noted that, since any two packets may be selected, if P2 is sent by end user device 36B before P1 is received by the device, D could be negative; however, this has no negative impact on the effectiveness or operation of the overall technique, as will be shown. Each network element R1', R2', calculates the delay between the two packets (i.e., "Delta_in_R1'" and "Delta_in_R2'", respectively). Referring to FIG. 3:

$$\text{Delta\_in\_}R1'=P2(R1')-P1(R1')=d2+d3+D+k3+k2$$

$$\text{Delta\_in\_}R2'=P2(R2')-P1(R2')=d3+D+k3$$

Figure 4:
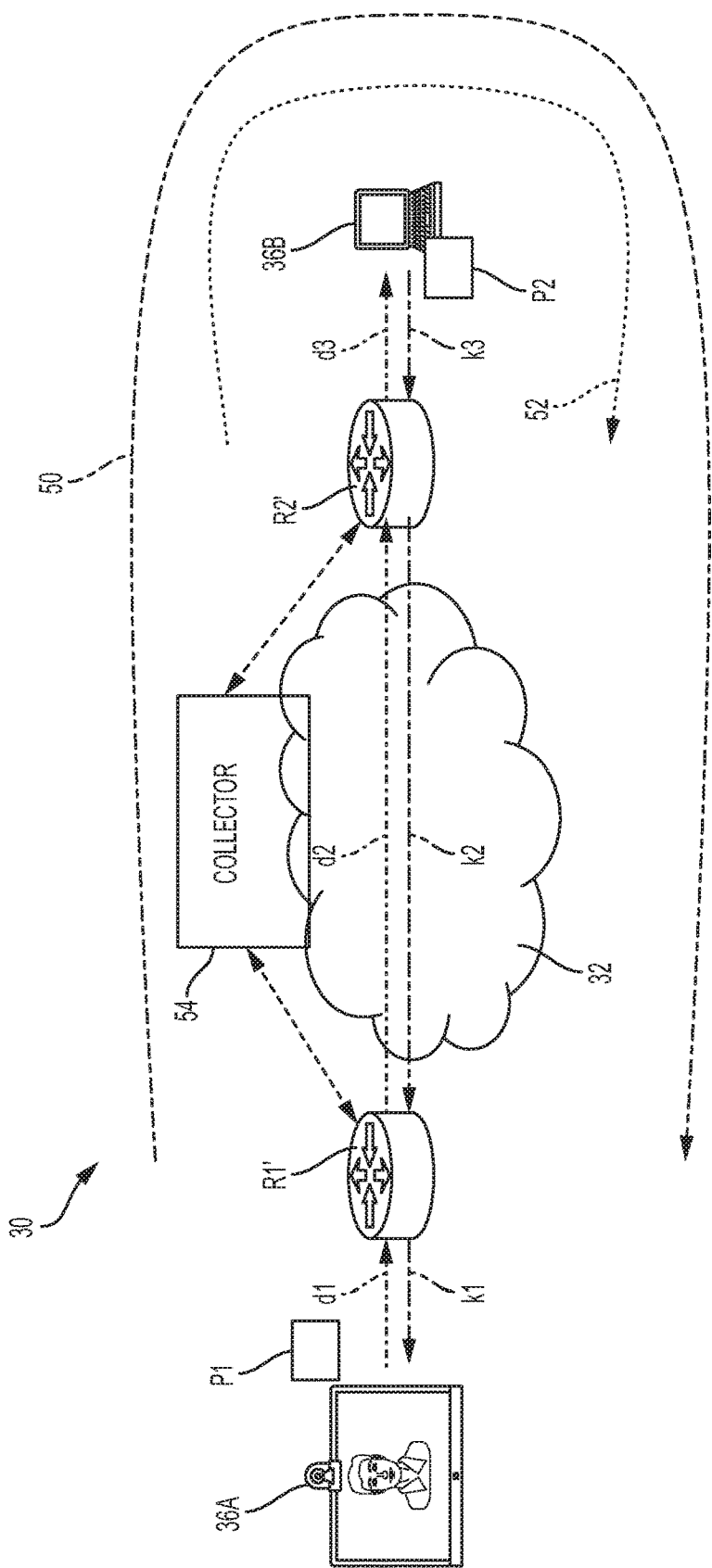
FIG. 4 is another simplified block diagram of an example communications environment in which is illustrated an example implementation of embodiments described herein for passive monitoring and measurement of network RTP delay.

Delta_in_R1' is represented in FIG. 4 by a path designated by a reference numeral 50 and Delta_in_R2' is represented in FIG. 4 by a path designated by a reference numeral 52.

The delta for each network element R1', R2', corresponds to the time between when the packet P1 is received at the network element and the packet P2 is received at the same network element. Each network element R1', R2', exports its delta to a collector 54. In certain embodiments, the collector 54 is implemented as a server that receives measurement information from each of the network elements R1', R2'. Alternatively, it could be implemented using any computing system, including one of the network elements R1', R2', or other device in the network 32. The primary assumption is that the information from both of the network elements R1', R2', is received at the same collector 54 so that the collector can use the measurements to determine the RTT. In some embodiments, the communication between the network elements R1', R2', and the collector 54 is based on Internet Protocol Flow Information eXport ("IPFIX"); however, any transport protocol could be used to carry the measurement data between the network elements and the collector.

The collector 54 determines the difference between the two deltas to obtain the RTT between the network elements R1' and R2':

$$\text{Delta\_in\_}R1-\text{Delta\_in\_}R2'=d2+k2=\text{RTT}$$

If we assume the same delay in each direction, the RTT could be divided by two to obtain the one direction delay. It should be noted that neither network element R1', R2', alone is capable of calculating the RTT; however, the collector 54 can do so using the information from both routers. The same calculations may be performed with respect to the other client 36A, in which case D2 would represent a time differential between the time at which the packet P1 is sent by the end user device 36A and the time at which the second packet P2 is received at the same end user device, and:

$$\text{Delta\_in\_}R1'=P1(R1')-P2(R1')=d1+D2+k1$$

$$\text{Delta\_in\_}R2'=P1(R2')-P2(R2')=d2+d1+D2+k1+k2$$

There are several issues to consider in connection with embodiments described herein. In particular, the reports from both of the network elements R1', R2', should be correlated. In order to accomplish that, calculation of deltas may be performed per flow (although any correlation of deltas can be used) and the collector 54 correlates the records from both network elements based on the flow tuple, which is exported with the record. Additionally, the deltas must be measured for the same two packets on both network elements. This could be accomplished by, for example, using logic at each network element that selects the packet having the first rounded sequence number ("seq#") (e.g., 110) in the interval in one direction as packet P1 and the packet having the next rounded seq# (e.g., 25470) in the interval in the other direction as packet P2. The exact seq# could be added to the record to prevent errors in controller correlation. It will be recognized that other methods of correlating the same packets could be used without impacting the operation of the techniques described herein. For example, for non RTP flows, the $10^{th}$ packet of the flow could be selected each time. Assuming the network element R1' submits a first record ("Record 1") to the collector 54 and the network element R2' submits a second record ("Record 2") to the collector, in one example implementation, the records may be represented as follows:

Record 1={flow tuple,delta_in_R1',seq#}

Record 2={flow tuple,delta_in_R2',seq#}

Record 1 and Record 2 correlate if each contain the same value for flow tuple and seq#.

In certain embodiments, both sets of deltas described above could be calculated at each of the network elements and submitted to the collector. In such embodiments, the delta measurements could be represented as input and output deltas, respectively, with the input delta corresponding to the delta between the input direction and the output direction of the monitored interface and the output delta corresponding to the delta between the output direction and the input direction of the monitored interface toward each end user device. In order to facilitate handling of drops and/or out-of-order packets, looking at the RTP seq#, the system can make sure there are no drops or out-of-order packets around the rounded seq#. In one example implementation, if dropped/out-of-order packets are detected, the record is not sent for that particular interval.

Embodiments described herein measure the RTP RTT delay with passive monitoring techniques and no assumption on active packet generation, clock synchronization, or packet tagging. Embodiments also measure the RTP delta between two packets flowing in different directions between two media clients via two network elements. A collector that receives the deltas calculates the RTT delay therefrom.

Advantages of embodiments described herein include that RTT delay is simple to calculate, provides passive monitoring for all flows, makes no assumptions regarding the traffic or routers, and does not require clock synchronization or tagging.

Figure 5A:
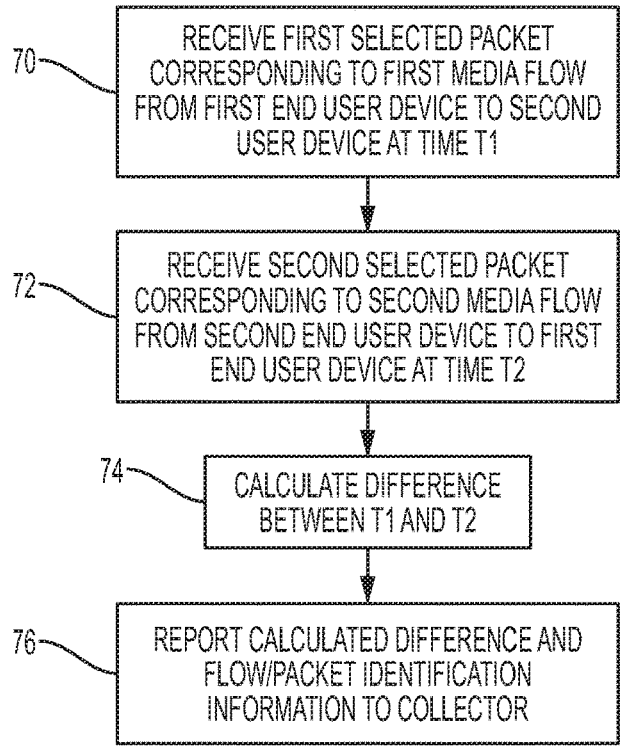
FIG. 5A illustrates a flowchart of a technique implemented at selected network elements for implementing embodiments described herein for passive monitoring and measurement of network RTP delay.

FIG. 5A illustrates a flowchart of a technique implemented at selected network elements, such as network elements R1', R2', for implementing embodiments described herein for passive monitoring and measurement of network RTP delay. As shown in FIG. 5, in step 70, a first selected packet corresponding to a first traffic flow from a first end user device to a second end user device is received at the network element at time T1. In step 72, a second selected packet corresponding to the first traffic flow or a second traffic flow from the second end user device to the first end user device is received at the network element at time T2. In step 74, the network determines a difference between when the first and second packets were received. In step 76, the network element reports the difference to a collector, along with information identifying the packets and the respective flows. It will be recognized that the same steps will be performed by a second network element with regard to the same two selected packets.

FIGURE SB illustrates a flowchart of a technique implemented at a collector element, such as collector 54, for implementing embodiments described herein for passive monitoring and measurement of network RTP delay. In step 80, the collector receives a report from the first network element, which includes time difference information corresponding to receipt at the first network element of first and second selected packets, as well as a flow tuple and sequence number, for example. In step 82, the collector receives a report from the second network element, which includes time difference information corresponding to receipt at the second network element of first and second selected packets, as well as a flow tuple and sequence number, for example. In step 84, the collector correlates the received records. In step 86, the collector uses the reported time delta information to determine a RTT delay for the network. In particular, the difference between the time difference reported by the first network element and the time difference reported by the second network element is equal to the RTT delay for the network.

Figure 6:
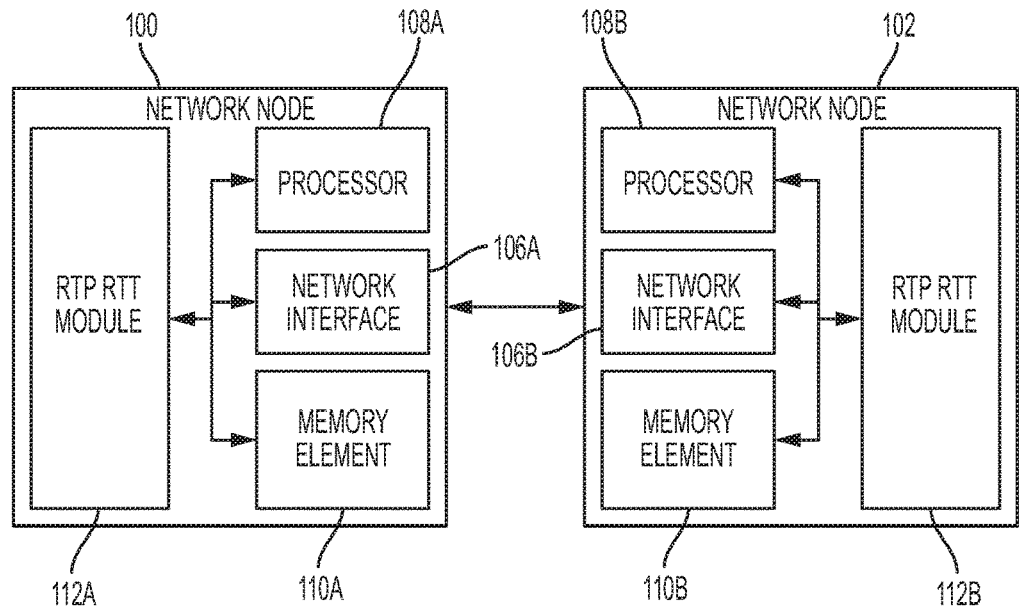
FIG. 6 is a simplified block diagram illustrating an example configuration of two network nodes, which may represent a network element and a collector, configured for performing for passive monitoring and measurement of network RTP delay in accordance with embodiments described herein.

FIG. 6 is a simplified block diagram of an example arrangement including a first node 100 which comprises a network element, such as one of network elements R1, R2, and a second node 102, which comprises a collector, such as collector 54. Each node 100, 102, includes one or more wired and/or wireless network interfaces 104A, 104B, at least one processor 106A, 106B, and a memory element 108A, 108B, interconnected by a system bus 110A, 110B, The network interfaces 104A, 104B, comprise the mechanical, electrical, and signaling circuitry for communicating data over a network and may be configured to transmit and/or receive data using a variety of different communication protocols. Note that each node 100, 100, may include one or more different types of network interfaces, and that the view herein is merely for illustration.

Figure 5B:
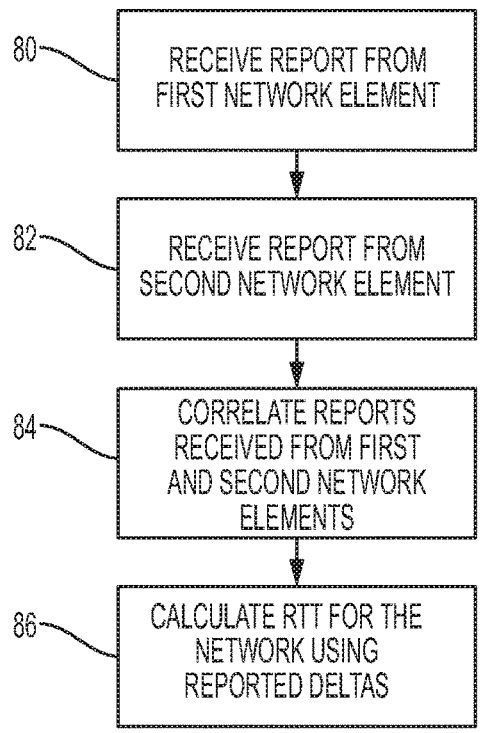
FIG. 5B illustrates a flowchart of a technique implemented at a collector element for implementing embodiments described herein for passive monitoring and measurement of network RTP delay.

Each of the memory elements 108A, 108B, comprises a plurality of storage locations that are addressable by the respective one of the processors 106A, 106B, and the network interfaces 104A, 104B, for storing software programs and data structures associated with the embodiments described herein. Each of the processors 106A, 106B, may comprise hardware elements or hardware logic adapted to execute the software programs, such as embodied in respective RTP RTT modules 112A, 112B, and manipulate data structures in the respective memory element 108A, 108B. Each of modules 112A, 112B, may comprise processes and/or services as described herein, such as illustrated in FIGS. 5A and 5B.

Figure 7:
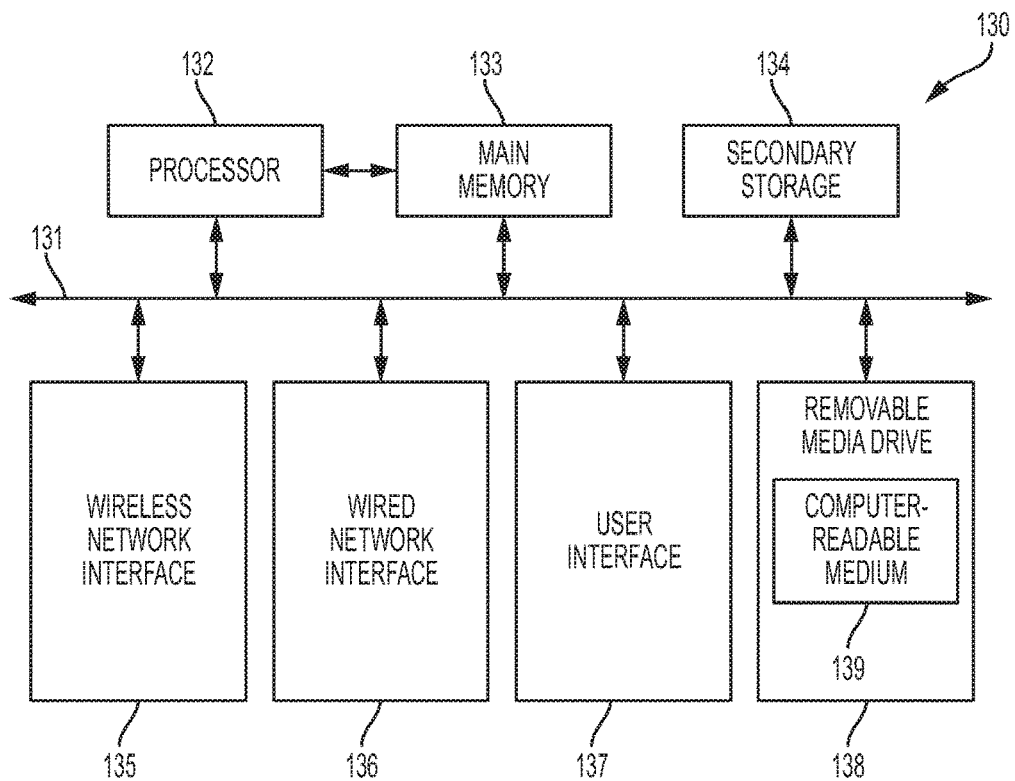
FIG. 7 is a simplified block diagram of a machine comprising an element of a communications network according to one or more examples of embodiments described herein for passive monitoring and measurement of network RTP delay.

Turning to FIG. 7, FIG. 7 illustrates a simplified block diagram of an example machine (or apparatus) 130, which in certain embodiments may be a network element or collector, that may be implemented in embodiments described herein. In particular, FIG. 7 illustrates a block diagram representation of an example form of a machine within which software and hardware cause machine 130 to perform any one or more of the activities or operations discussed herein. As shown in FIG. 7, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 7 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
at a first network element of a communications network:
receiving a first packet corresponding to a first traffic flow from a first end user device to a second end user device at a time T1;
receiving a second packet corresponding to a second traffic flow from the second end user device to the first end user device at a time T2;
calculating by the first network element a difference $\Delta 1$ between the time T1 and the time T2;
creating a first record including the calculated difference $\Delta 1$; and
providing the first record to a network collector device,
at a second network element of the communications network different from the first network element:
receiving the first packet at a time T3;
receiving the second packet at a time T4;
calculating by the second network element a difference $\Delta 2$ between the time T3 and the time T4;
creating a second record including the calculated difference $\Delta 2$; and
providing the second record to the network collector device,
wherein the network collector device compares the first record with the second record to determine a round trip time delay for the communications network, wherein the round trip time delay is utilized to improve network performance of the communications network.

2. The method of claim 1, wherein the first record includes information identifying the first and second packets.

3. The method of claim 1, wherein the first record includes a sequence number for each of the first and second packets.

4. The method of claim 1, wherein the first record includes a flow tuple for each of the first and second flows.

5. The method of claim 1, wherein the network collector device correlates the first and second records using at least one of a flow tuple or a sequence number included in the first and second records.

6. The method of claim 1, wherein the first and second network elements comprise Wide Area Network border routers.

7. The method of claim 1, wherein the network collector device comprises a server.

8. The method of claim 1, wherein the network collector device comprises one of the first network element or the second network element.

9. One or more non-transitory tangible media that includes code for execution and when executed by a first processor of a first network element of a communications network configures the first processor to perform operations comprising:
receiving a first packet corresponding to a first traffic flow from a first end user device to a second end user device at a time T1;
receiving a second packet corresponding to a second traffic flow from the second end user device to the first end user device at a time T2;
calculating by the first network element a difference $\Delta 1$ between the time T1 and the time T2;
creating a first record including the calculated difference $\Delta 1$; and
providing the first record to a network collector device,
wherein the code when executed by a second processor of a second network element of the communications network different from the first network element configures the second processor to perform operations comprising:
receiving the first packet at a time T3;
receiving the second packet at a time T4;
calculating by the second network element a difference Δ2 between the time T3 and the time T4;
creating a second record including the calculated difference Δ2; and
providing the second record to the network collector device, and
wherein the code causes the network collector device to compare the first record with the second record to determine a round trip time delay for the communications network, wherein the round trip time delay is utilized to improve network performance of the communications network.

10. The media of claim 9, wherein the first record includes information identifying the first and second packets.

11. The media of claim 9, wherein the first record includes a sequence number for each of the first and second packets.

12. The media of claim 9, wherein the first record includes a flow tuple for each of the first and second flows.

13. The media of claim 9, wherein the network collector device correlates the first and second records using at least one of a flow tuple or a sequence number included in the first and second records.

14. The media of claim 9, wherein the network collector device comprises at least one of a server, the first network element, or the second network element.

15. A system comprising a first network element and a second network element of a communications network, each of the first network element and the second network element including:
a memory element configured to store data; and
a processor operable to execute instructions associated with the data;
the processor of the first network element configured for:
receiving a first packet corresponding to a first traffic flow from a first end user device to a second end user device at a time T1;
receiving a second packet corresponding to a second traffic flow from the second end user device to the first end user device at a time T2;
calculating a difference Δ1 between the time T1 and the time T2;
creating a first record including the calculated difference 1; and
providing the first record to a network collector device, the processor of the second network element configured for:
receiving the first packet at a time T3;
receiving the second packet at a time T4;
calculating by the second network element a difference Δ2 between the time T3 and the time T4;
creating a second record including the calculated difference Δ2; and
providing the second record to the network collector device,
wherein the network collector device compares the first record with the second record to determine a round trip time delay for the communications network, wherein the round trip time delay is utilized to improve network performance of the communications network.

16. The system of claim 15, wherein the network collector device correlates the first and second records using at least one of a flow tuple or a sequence number included in the first and second records.

17. The system of claim 15, wherein the first and second network elements comprise Wide Area Network ("WAN") border routers.

18. The system of claim 15, wherein the network collector device comprises at least one of a server, the first network element, or the second network element.

19. The system of claim 15, wherein the first record includes information identifying the first and second packets.

20. The system of claim 15, wherein the first record includes a sequence number for each of the first and second packets.

* * * * *